US010542177B2

(12) United States Patent
Chitpasong (10) Patent No.: US 10,542,177 B2
(45) Date of Patent: Jan. 21, 2020

(54) IMAGE PROCESSING APPARATUS HAVING FUNCTION FOR USING AUXILIARY STORAGE TOGETHER WITH RAM AS VIRTUAL MEMORY, AND FOR SELECTIVELY APPLYING DIFFERENT POWER-SAVING MODES TO AUXILIARY STORAGE IN ACCORDANCE WITH AVAILABLE FREE SPACE IN RAM, AND NON-TRANSITORY RECORDING MEDIUM STORING COMPUTER READABLE PROGRAM FOR THE SAME (71) Applicant: KONICA MINOLTA, INC., Chiyoda-ku, Tokyo (JP)

(72) Inventor: Bounta Chitpasong, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/879,122

(22) Filed: Jan. 24, 2018

(65) Prior Publication Data
US 2018/0220035 A1 Aug. 2, 2018

(30) Foreign Application Priority Data

Feb. 2, 2017 (JP) .................................. 2017-017339

(51) Int. Cl.
*G06F 3/12* (2006.01)
*H04N 1/32* (2006.01)
*H04N 1/00* (2006.01)

(52) U.S. Cl.
CPC ..... *H04N 1/32673* (2013.01); *H04N 1/00896* (2013.01); *H04N 1/32448* (2013.01); *H04N 2201/0094* (2013.01)

(58) Field of Classification Search
None
See application file for complete search history.

(56) References Cited

U.S. PATENT DOCUMENTS

2012/0155945 A1* 6/2012 Ogushi .................... B41J 29/38
400/76
2016/0205275 A1* 7/2016 Kadobayashi ..... H04N 1/00204
358/1.15

FOREIGN PATENT DOCUMENTS

| JP | 2007307745 A | 11/2007 |
| JP | 2012131081 A | 7/2012 |
| JP | 2015023556 A | 2/2015 |

* cited by examiner

*Primary Examiner* — Henok Shiferaw
(74) *Attorney, Agent, or Firm* — Holtz, Holtz & Volek PC (57) ABSTRACT An image processing apparatus includes a memory, an auxiliary storage used as a virtual memory together with the memory, and a hardware processor. The hardware processor determines whether or not a predetermined region set in the memory has a free space corresponding to a size of a necessary region to be reserved for execution of a specific application. When determining that the predetermined region does not have the free space, the hardware processor applies a first power-saving mode as a power-saving mode of the auxiliary storage. When determining that the predetermined region has the free space, the hardware processor applies, as the power-saving mode of the auxiliary storage, a second power-saving mode in which less power is consumed than in the first power-saving mode.

7 Claims, 7 Drawing Sheets

IMAGE PROCESSING APPARATUS HAVING FUNCTION FOR USING AUXILIARY STORAGE TOGETHER WITH RAM AS VIRTUAL MEMORY, AND FOR SELECTIVELY APPLYING DIFFERENT POWER-SAVING MODES TO AUXILIARY STORAGE IN ACCORDANCE WITH AVAILABLE FREE SPACE IN RAM, AND NON-TRANSITORY RECORDING MEDIUM STORING COMPUTER READABLE PROGRAM FOR THE SAME

The entire disclosure of Japanese Patent application No. 2017-017339, filed on Feb. 2, 2017, is incorporated herein by reference in its entirety.

BACKGROUND

1. Technological Field

The present invention relates to a technology for saving power in an image processing apparatus such as a Multi-Functional Peripheral (MFP) and so on.

2. Description of the Related Art

Recent years have seen the widespread use of image forming apparatuses into which functions such as copying, scanning, faxing, and box function are integrated. Such an image forming apparatus is sometimes called a "multifunction device" or a "Multi-Functional Peripheral (MFP)".

Unlike personal computers, the image forming apparatuses are always turned ON in many cases. Since a time during which the image forming apparatus enters in an idle state is long, saving electric power therein is strongly urged.

In view of this, where the idle state of the image forming apparatus lasts for a certain amount of time, supplying power to some of hardware modules such as a touch-sensitive panel display, a scanner unit, a printing unit, or a hard disk drive is stopped while supplying power to some of the hardware modules such as a Central Processing Unit (CPU) and a Random Access Memory (RAM) is kept so that a job can be received. This saves power in the image forming apparatus.

The following technologies have been proposed to save power in the image forming apparatuses.

According to one of the technologies, an image forming apparatus stops supplying power to a part of modules, such as a reading module when the image forming apparatus is turned into a first power saving mode. Thereafter, when the image forming apparatus is turned into a second power saving mode, the image forming apparatus stores at least a part of data stored in a second storing section constituted of a hard disk drive in a first storing section constituted of a memory of an RAM or the like. When the image forming apparatus receives a job request from an external device in the second power saving mode, it responds to the job request based on the data stored at least either the first storing section or the second storing section (Japanese Laid-open Patent Publication No. 2007-307745).

According to one of the technologies, a data output apparatus stores a plurality of sets of data successively inputted into a first storage in a state where power supply to a second storage larger in power consumption than the first storage is stopped, and when idle capacity of the first storage becomes a threshold or less, the data output apparatus starts supplying operational power to the second storage. After the second storage is switched to an operating state, the data output apparatus stores data which has not yet been stored into the second storage in place of the first storage. After storing all the plurality of sets of data, the data output apparatus transfers the data from the second storage to the first storage for duplication in the reverse order to the input order. In a process of reading out the data in the same order as the input order, when all the sets of data to be subsequently read out are stored in the first storage, the data output apparatus stops supplying the operation power to the second storage (Japanese Laid-open Patent Publication No. 2015-23556).

In the meantime, where the performance and functionality of the image forming apparatus are becoming sophisticated, the capacity necessary in the RAM increases. Besides, applications have recently been developed more easily than is conventionally possible to be installed on the image forming apparatus.

Therefore, after installation of the image forming apparatus, as the number of applications is increased, the image forming apparatus tends to run out of free space on the RAM.

To address this, as a technology for reserving a free space on the RAM, a virtual memory technology has come into widespread use. The virtual memory technology uses a method of swapping out some programs or data stored in the RAM to a hard disk drive or an auxiliary storage such as a Solid State Drive (SSD). As one example of the technology, the following technology has been proposed.

A printing apparatus includes a memory for temporarily storing various information, a storing processing means for copying a part of print information stored in a hard disk drive to the memory at a shift from a first operating condition in which the hard disk drive is turned ON to a second operating condition in which the hard disk drive is turned OFF, a comparison means for comparing the requested print information with the print information stored in the memory when acquiring the print information is requested by a host device after the shift to the second operating condition, and a response means for transmitting the response to the host device of the request source, by using the print information stored in the memory when the comparison result shows that the requested print information is stored in the memory (Japanese Laid-open Patent Publication No. 2012-131081).

Meanwhile, while supplying power to the auxiliary storage is stopped, it is impossible to swap out the data saved in the RAM to the auxiliary storage or to swap in, to the RAM, the data which has been swapped out to the auxiliary storage.

Thus, for swapping out or swapping in in the use of the virtual memory, it is necessary to resume supplying power to the auxiliary storage so that the auxiliary storage operates as usual.

However, where it takes a long time for the auxiliary storage to operate normally, the following problem occurs in some cases. Suppose that, when an image forming apparatus starts receiving fax data, it takes time for the auxiliary storage to operate normally although it is necessary to swap out data to the auxiliary storage to create free space on the RAM. This sometimes causes the fax data not to be saved to the RAM and to be lost.

SUMMARY

The present invention has been achieved in light of such a problem, and therefore, an object of an embodiment of the present invention is to prevent data loss in using a virtual memory and to save power in an auxiliary storage.

To achieve at least one of the abovementioned objects, according to an aspect of the present invention, an image processing apparatus reflecting one aspect of the present invention includes a memory, an auxiliary storage used as a virtual memory together with the memory, and a hardware processor. The hardware processor determines whether or not a predetermined region set in the memory has a free space corresponding to a size of a necessary region to be reserved for execution of a specific application. When determining that the predetermined region does not have the free space, the hardware processor applies a first power-saving mode as a power-saving mode of the auxiliary storage. When determining that the predetermined region has the free space, the hardware processor applies, as the power-saving mode of the auxiliary storage, a second power-saving mode in which less power is consumed than in the first power-saving mode.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Hereinafter, one or more embodiments of the present invention will be described with reference to the drawings. However, the scope of the invention is not limited to the disclosed embodiments.

First Embodiment

Figure 1:
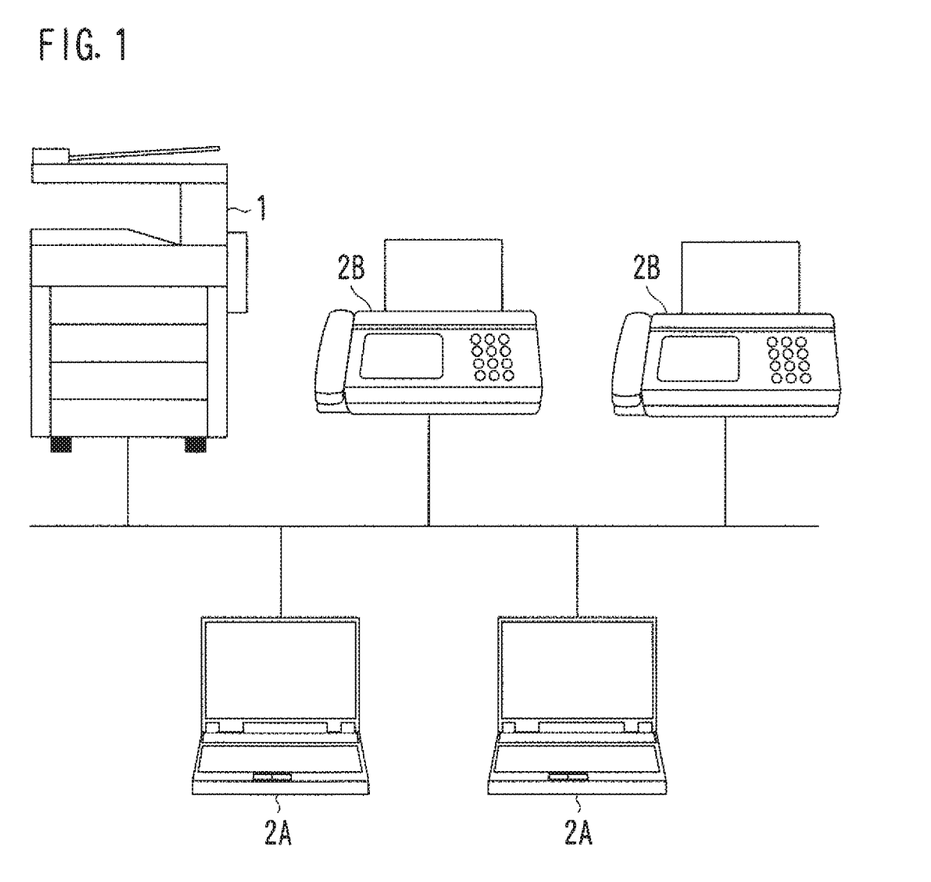
FIG. 1 is a diagram showing an example of the overall configuration of a network system including an image forming apparatus.
Figure 2:
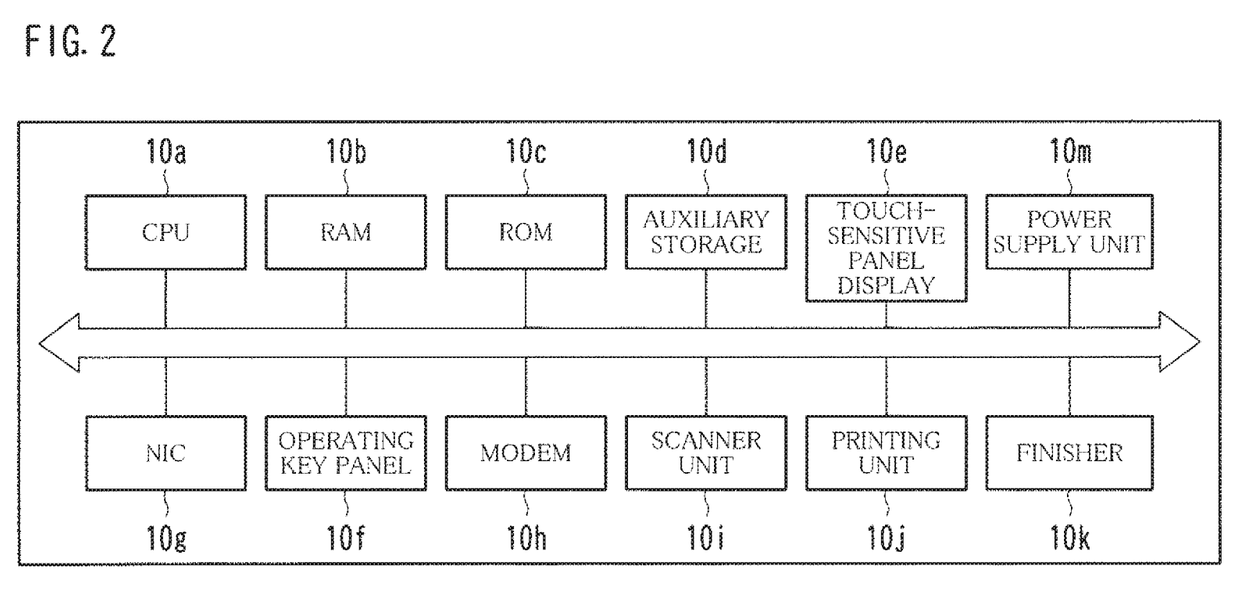
FIG. 2 is a diagram showing an example of the hardware configuration of an image forming apparatus.
Figure 3:
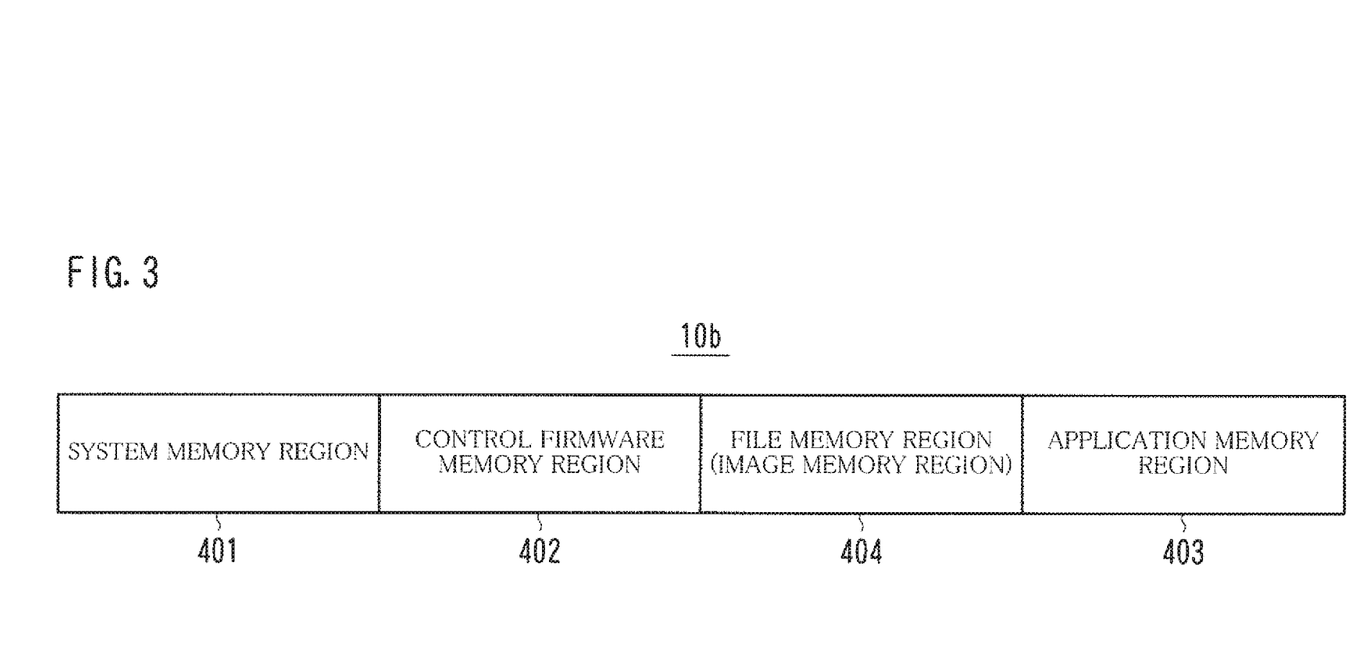
FIG. 3 is a diagram showing an example of a memory region of a RAM.
Figure 4:
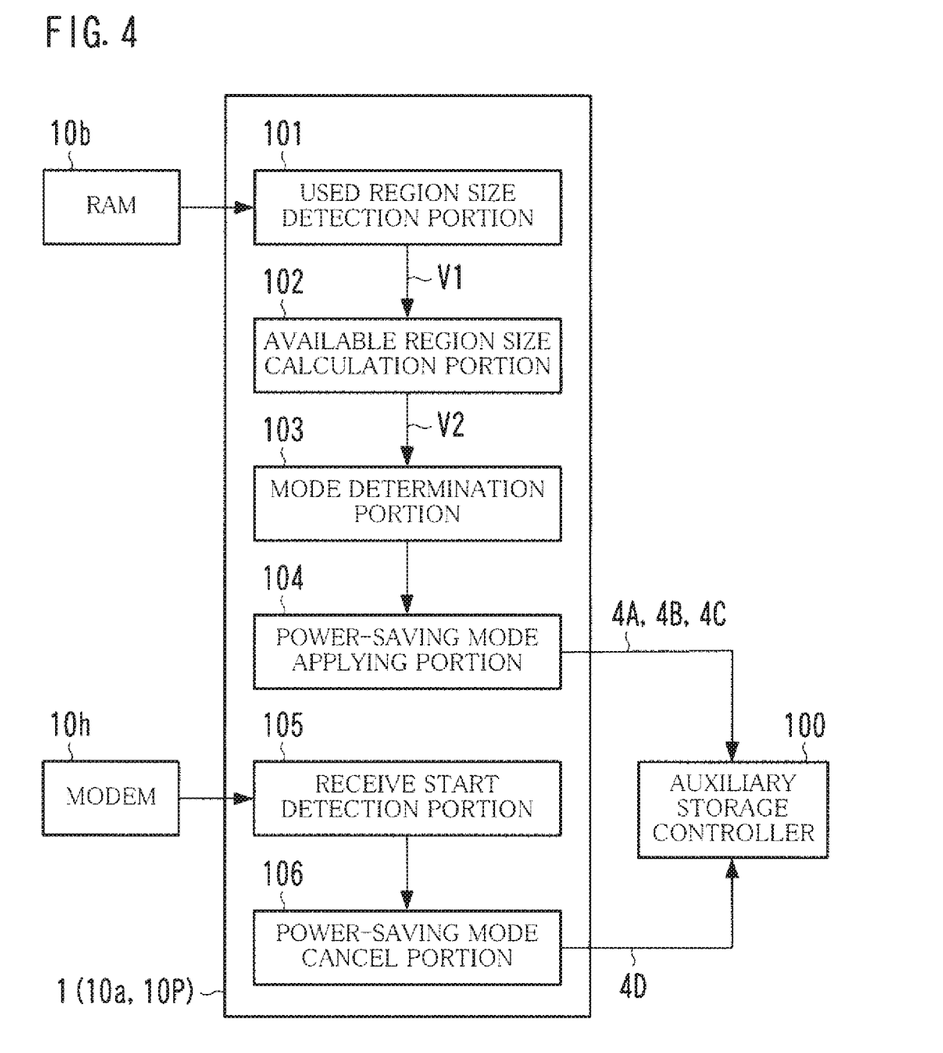
FIG. 4 is a diagram showing an example of the functional configuration of an image forming apparatus.

FIG. 1 is a diagram showing an example of the overall configuration of a network system including an image forming apparatus 1. FIG. 2 is a diagram showing an example of the hardware configuration of the image forming apparatus 1. FIG. 3 is a diagram showing an example of a memory region of a RAM 10b. FIG. 4 is a diagram showing an example of the functional configuration of the image forming apparatus 1.

The image forming apparatus 1 shown in FIG. 1 is an image processing apparatus generally called a "multifunction device" or a "Multi-Functional Peripheral (MFP)". The image forming apparatus 1 is an apparatus into which functions such as copying, PC printing, fax transmission, fax reception, scanning, and box function are incorporated.

The image forming apparatus 1 is configured to perform communication with a terminal 2A, a facsimile terminal 2B, and so on via a communication line 3. Examples of the communication line 3 include the Internet, a Local Area Network (LAN), and a public line. The terminal 2A is, for example, a personal computer, a tablet computer, or a smartphone.

The PC printing function is to print an image onto paper based on image data received from the terminal 2A.

The fax transmission function is to read an image out of paper to send the image to the facsimile terminal 2B in the form of fax data.

The fax reception function is to receive an image from the facsimile terminal 2B in the form of fax data to print the image onto paper.

According to the box function, each user is given a storage area called a "box" or a "personal box". The box function enables each user to save image data and so on to his/her storage area and to manage the image data and so on therein. The box corresponds to a "folder" or a "directory" in a personal computer.

Referring to FIG. 2, the image forming apparatus 1 is configured of a Central Processing Unit (CPU) 10a, a Random Access Memory (RAM) 10b, a Read Only Memory (ROM) 10c, an auxiliary storage 10d, a touch-sensitive panel display 10e, an operating key panel 10f, a Network Interface Card (NIC) 10g, a modem 10h, a scanner unit 10i, a printing unit 10j, a finisher 10k, a power supply unit 10m, and so on.

The touch-sensitive panel display 10e displays, for example, a screen for presenting messages to the user, a screen for allowing the user to enter commands or information, and a screen for showing the results of processing executed by the CPU 10a. The touch-sensitive panel display 10e sends a signal indicating a touched location to the CPU 10a.

The operating key panel 10f is a so-called hardware keyboard. The operating key panel 10f has numeric keys, a start key, a stop key, and a function key.

The NIC 10g performs communication with other device such as the terminal 2A in accordance with a protocol such as Transmission Control Protocol/Internet Protocol (TCP/IP).

The modem 10h sends/receives image data with the facsimile terminal 2B in accordance with a protocol such as G3.

The scanner unit 10i optically reads an image on a sheet of paper placed on a platen glass to generate image data thereof.

The printing unit 10j prints, onto paper, an image read out by the scanner unit 10i and an image received, by the NIC 10g or the modem 10h, from the terminal 2A or the facsimile terminal 2B.

The finisher 10k applies a post-process, if necessary, to a printed matter obtained by the printing unit 10j. The post-process includes stapling the printed matter with a stapler, punching a hole in the printed matter, and folding the printed matter.

The power supply unit 10m supplies electric power to the hardware modules described above in response to a command given from the CPU 10a, and so on.

The ROM 10c or the auxiliary storage 10d has installed, therein, an operating system, applications for implementing the foregoing functions such as copying, PC printing, fax transmission, and fax reception, and other various functions.

The applications are loaded into the RAM 10b as necessary, and are executed by the CPU 10a. Basically, the applications for the functions of copying, PC printing, fax transmission, and fax reception are always loaded in the RAM 10b. The other applications are loaded to the RAM 10b or deleted from the RAM 10b appropriately.

Some seta of the data stored in the RAM 10b are swapped to the auxiliary storage 10d. Stated differently, the auxiliary storage 10d is used for a virtual memory. Examples of the auxiliary storage 10d include a hard disk drive and a Solid State Drive (SSD). Hereinafter, an example is taken in which the auxiliary storage 10d is a hard disk drive.

The auxiliary storage 10d has two power-saving modes: a sleep mode; and a standby mode.

In the standby mode, the rotational speed of a magnetic disk is reduced to a speed lower than a normal speed, or, alternatively, the rotation thereof is stopped to save electric power. In the sleep mode, supplying the electric power to the magnetic disk is stopped to save electric power.

The power-saving methods in the sleep mode and in the standby mode are sometimes different from each other depending on a model of the auxiliary storage 10d. At any rate, an effect of power-saving is higher in the sleep mode than in the standby mode. However, the sleep mode needs more time for reset than the standby mode does.

As shown in FIG. 3, the RAM 10b has segment regions such as a system memory region 401, a control firmware memory region 402, an application memory region 403, and a file memory region 404 for use. The size of the file memory region 404 is equal to or larger than a predetermined size. The size is hereinafter referred to as a "file memory size V0".

In the system memory region 401, a kernel of the operating system in the image forming apparatus 1, various data managed by the operating system, and so on are stored.

In the control firmware memory region 402, programs and data of firmware for controlling each piece of hardware of the image forming apparatus 1 are stored. As one of pieces of firmware, auxiliary storage managing firmware is stored. The auxiliary storage managing firmware implements the functions of an auxiliary storage controller 100. The auxiliary storage controller 100 serves to control the supply of electric power to the auxiliary storage 10d, or, a rotational speed of the magnetic disk of the auxiliary storage 10d.

In the application memory region 403, a program of an application and so on are stored.

In the file memory region 404, data dealt in an application and so on are stored.

For example, image data received by the modem 10h is stored in the file memory region 404 as data dealt in the fax application. Alternatively, PC printing image data received by the NIC 10g is stored in the file memory region 404. Yet alternatively, as data dealt in a Mobile Enterprise Application Platform (MEAP), data for Lightweight Directory Access Protocol (LDAP) authentication, Movable Type (MT) authentication, or Single Sign On (SSO) authentication are stored in the file memory region 404. Yet alternatively, as data dealt in an application for reproducing a moving image, a file of a format such as Moving Picture Experts Group (MPEG) is stored.

The file memory region 404 is sometimes called a "file memory" or an "image memory region".

Where the application memory region 403 runs short of free space, an application is loaded to the file memory region 404 in some cases.

The operating system or the firmware includes a power-saving program 10P for managing the power-saving mode of the auxiliary storage 10d. Even when the auxiliary storage 10d is used for the virtual memory, the power-saving program 10P prohibits data sent from another device from being lost and saves electric power consumption of the auxiliary storage 10d. The mechanism thereof is described below.

The power-saving program 10P implements the functions of a used region size detection portion 101, an available region size calculation portion 102, a mode determination portion 103, a power-saving mode applying portion 104, a receive start detection portion 105, a power-saving mode cancel portion 106, and so on, all of which are shown in FIG. 4.

The used region size detection portion 101 detects the size of a region currently occupied in the file memory region 404 when a state in which the image forming apparatus 1 idles lasts for a predetermined amount of time (3 minutes, for example). The size is hereinafter referred to as a "used region size V1". The predetermined amount of time is settable arbitrarily in advance by an administrator of the image forming apparatus 1.

The used region size V1 can be detected by using known methods. For example, the used region size detection portion 101 makes an inquiry to a specific module monitoring or managing the RAM 10b, e.g., a system monitor of the operating system, to detect the used region size V1.

When the used region size detection portion 101 detects the used region size V1, the available region size calculation portion 102 calculates the size of a region currently available in the file memory region 404 based on the used region size V1. The size of a region currently available is hereinafter referred to as an "available region size V2". The available region size V2 is calculated based on the following Equation (1).

$$V2=V0-V1 \qquad (1)$$

When the available region size calculation portion 102 calculates the available region size V2, the mode determination portion 103 determines which of the sleep mode and the standby mode is to be applied to the auxiliary storage 10d depending on the available region size V2. How to make the determination is described below.

If the available region size V2 is smaller than a threshold Vt, then the mode determination portion 103 determines that the power-saving mode to be applied is the standby mode. On the other hand, if the available region size V2 is equal to or greater than the threshold Vt, then the mode determination portion 103 determines that the power-saving mode to be applied is the sleep mode. The threshold Vt is equal to the size of image data for 1 page fax.

The power-saving mode applying portion 104 applies, to the auxiliary storage 10d, the power-saving mode determined by the mode determination portion 103.

To be specific, where the power-saving mode is determined to be the standby mode, the power-saving mode applying portion 104 uses a known method to reduce the rotational speed of the magnetic disk of the auxiliary storage 10d to a predetermined rotational speed or to stop the rotation thereof. For example, the power-saving mode applying portion 104 gives a predetermined command (standby command 4A) to the auxiliary storage controller 100. In response to the command, the auxiliary storage controller 100 controls the auxiliary storage 10d to reduce the rotational speed of the magnetic disk to the predetermined rotational speed or to stop the rotation thereof.

On the other hand, where the power-saving mode is determined to be the sleep mode, the power-saving mode applying portion 104 uses a known method to stop supplying the electric power to the auxiliary storage 10d. For example, the power-saving mode applying portion 104 gives a predetermined command (sleep command 4B) to the auxiliary storage controller 100. In response to the command, the auxiliary storage controller 100 controls the power supply unit 10m to stop supplying the electric power to the auxiliary storage 10d.

After the sleep mode is applied, at regular intervals (every 10 seconds, for example), the used region size detection portion 101 detects the used region size V1 and the available region size calculation portion 102 calculates the available region size V2. When the available region size V2 becomes smaller than the threshold Vt, the power-saving mode applying portion 104 applies the standby mode to the auxiliary storage 10d, for example, by sending a standby command 4C to the auxiliary storage controller 100. In response to the command, the auxiliary storage controller 100 controls the power supply unit 10m to resume supplying the electric power to the auxiliary storage 10d, and controls the auxiliary storage 10d to rotate the magnetic disk at a rotational speed suitable for the standby mode. In the standby mode, controlling only the power supply unit 10m is sufficient in order to keep the rotation of the magnetic disk stop.

Even after the standby mode is applied, at regular intervals, the used region size detection portion 101 detects the used region size V1 and the available region size calculation portion 102 calculates the available region size V2 in a manner similar to that described above. When the available region size V2 becomes equal to or greater than the threshold Vt, the power-saving mode applying portion 104 applies the sleep mode to the auxiliary storage 10d, for example, by sending the sleep command 4B to the auxiliary storage controller 100.

After the sleep mode or the standby mode is applied to the auxiliary storage 10d, the receive start detection portion 105 monitors the modem 10h all the time, and detects a start of processing for receiving fax data by the modem 10h. For example, the receive start detection portion 105 preferably detects the start of processing for receiving when the modem 10h receives an incoming call. Alternatively, the receive start detection portion 105 may detect the start of processing for receiving when connection with the calling facsimile terminal 2B is established. Yet alternatively, the receive start detection portion 105 may detect the start of processing for receiving when the modem 10h receives a CNG signal from the calling facsimile terminal 2B.

When the receive start detection portion 105 detects the start of processing for receiving, the power-saving mode cancel portion 106 uses a known method to cancel the power-saving mode of the auxiliary storage 10d. For example, the power-saving mode cancel portion 106 gives a predetermined command (cancel command 4D) to the auxiliary storage controller 100.

In response to the command, where the sleep mode is applied to the auxiliary storage 10d, the auxiliary storage controller 100 performs the control as described below. To be specific, the auxiliary storage controller 100 controls the power supply unit 10m to resume supplying the electric power to the auxiliary storage 10d, and controls the auxiliary storage 10d to rotate the magnetic disk at a normal rotational speed. On the other hand, where the standby mode is applied to the auxiliary storage 10d, the auxiliary storage controller 100 controls the auxiliary storage 10d to rotate the magnetic disk at a normal rotational speed.

Figure 5:
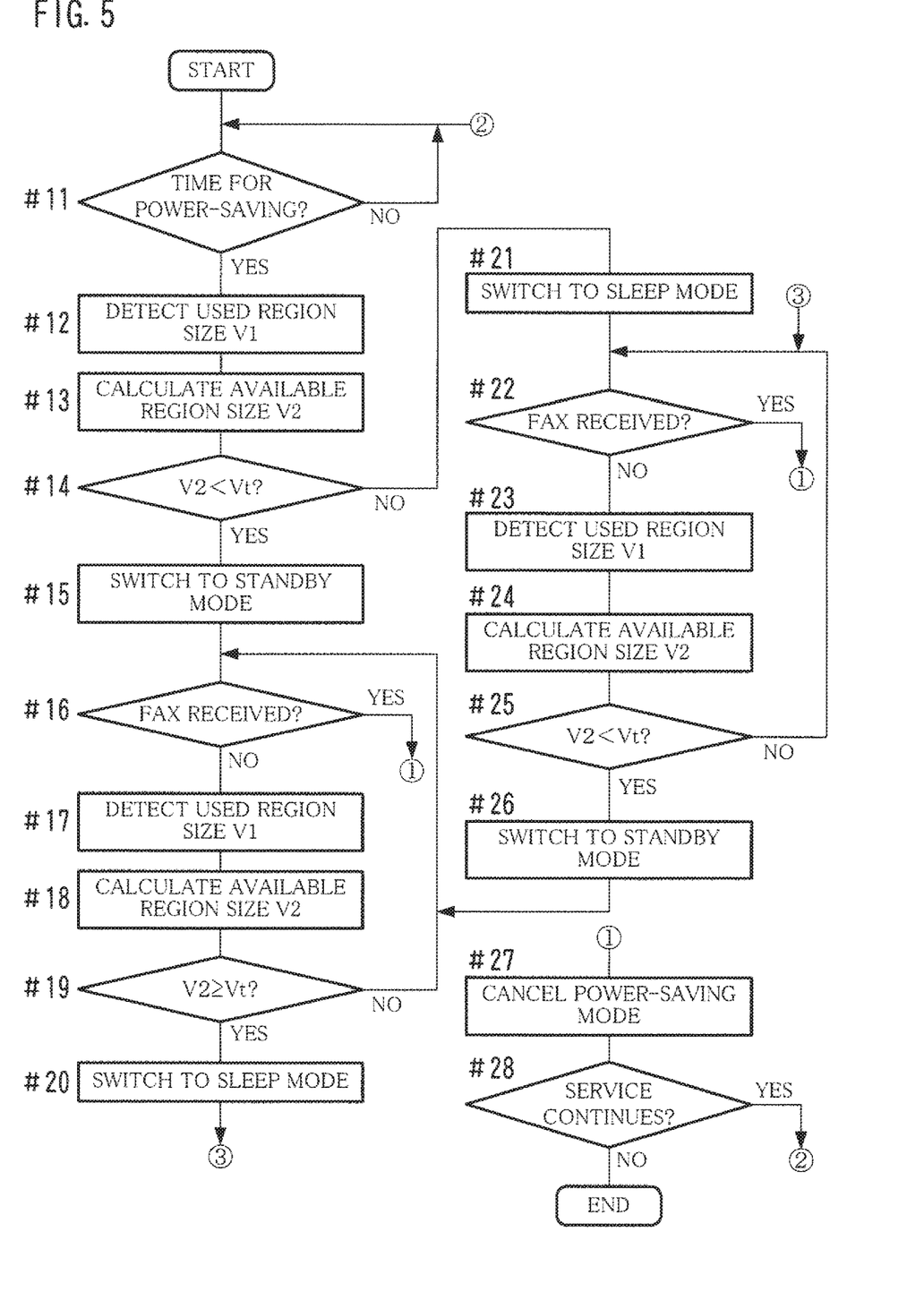
FIG. 5 is a flowchart depicting an example of the flow of processing for managing a power-saving mode of an auxiliary storage.

FIG. 5 is a flowchart depicting an example of the flow of processing for managing the power-saving modes of the auxiliary storage 10d.

The description goes on to the flow of the entire processing of the image forming apparatus 1. The description is provided with reference to the flowchart. The image forming apparatus 1 performs the processing based on the power-saving program 10P in the steps depicted in FIG. 5.

When a time at which to switch the mode of the auxiliary storage 10d to the power-saving mode is reached (YES in Step #11 of FIG. 5), the image forming apparatus 1 detects the used region size V1 (Step #12) and calculates an available region size V2 based on the foregoing equation (1) (Step #13).

If the available region size V2 is smaller than the threshold Vt (YES in Step #14), then the image forming apparatus 1 determines that the power-saving mode to be applied is the standby mode to change the power-saving mode of the auxiliary storage 10d to the standby mode (Step #15).

After changing to the standby mode, the image forming apparatus 1 detects the used region size V1 at constant intervals (Step #17) and calculates the available region size V2 (Step #18) at constant intervals before a predetermined event related to fax reception (incoming call, connection to the calling facsimile terminal 2B, or receiving of the CNG signal, for example) occurs (NO in Step #16). If the available region size V2 reaches the threshold Vt or greater (YES in Step #19), then the image forming apparatus 1 changes the power-saving mode of the auxiliary storage 10d to the sleep mode (Step #20).

On the other hand, if the available region size V2 is equal to or greater than the threshold Vt (NO in Step #14), then the image forming apparatus 1 determines that the power-saving mode to be applied is the sleep mode to change the power-saving mode of the auxiliary storage 10d to the sleep mode (Step #21).

After changing to the sleep mode, the image forming apparatus 1 detects the used region size V1 at constant intervals (Step #23) and calculates the available region size V2 (Step #24) at constant intervals before the predetermined event related to fax reception occurs (NO in Step #22). If the available region size V2 becomes smaller than the threshold Vt (YES in Step #25), then the image forming apparatus 1 changes the power-saving mode of the auxiliary storage 10d to the standby mode (Step #26).

After the power-saving mode is changed to the standby mode or the sleep mode, it is supposed that the predetermined event related to fax reception occurs (YES in Step #16 or YES in Step #22). In such a case, the image forming apparatus 1 cancels the power-saving mode of the auxiliary storage 10d and restores the rotation of the magnetic disk of the auxiliary storage 10d to the normal rotational speed (Step #27).

While providing service (YES in Step #28), the image forming apparatus 1 performs the processing of Steps #11-27 appropriately.

According to the first embodiment, in using the virtual memory, the image forming apparatus 1 can save power consumed in the auxiliary storage 10d and prevent data received from the terminal 2A or the facsimile terminal 2B from being lost.

In the first embodiment, as the threshold Vt, the size of image data for 1 page fax is used. However, if a plurality of fax lines can be used concurrently, the size of image data depending on the number of fax lines may be used as the threshold Vt. Stated differently, if N fax lines can be used concurrently, then the size of image data for N pages fax may be used as the threshold Vt.

Where an image quality mode for faxing is settable on the image forming apparatus 1, the size of image data for 1 page fax changes depending on the image quality mode. In such a case, every time the image quality mode is changed, the size, corresponding to the post-change mode, of image data for 1 page fax (or for N pages fax) is preferably used as the threshold Vt. The threshold Vt is smaller in the case where the image quality mode is a low image quality mode than in the case where the image quality mode is a high image quality mode.

Where the image forming apparatus 1 is capable of both color faxing and monochrome faxing, the threshold Vt may be changed depending on whether the color faxing is to be used or the monochrome faxing is to be used. In short, either the size of image data for 1 page (N pages) color faxing or the size of image data for 1 page (N pages) monochrome faxing is selectively used.

Alternatively, as the threshold Vt, the size of image data for 1 page PC printing may be used. Yet alternatively, the number of terminals 2A concurrently using the PC printing function may be estimated in advance and the size depending on the number of terminals 2A may be used. To be specific, when it is presumed that M terminals 2A concurrently use the PC printing function, the size of image data for M pages PC printing may be used as the threshold Vt.

Yet alternatively, as the threshold Vt, the sum of the size of image data for N pages fax and the size of image data for M pages PC printing may be used.

Second Embodiment

Figure 6:
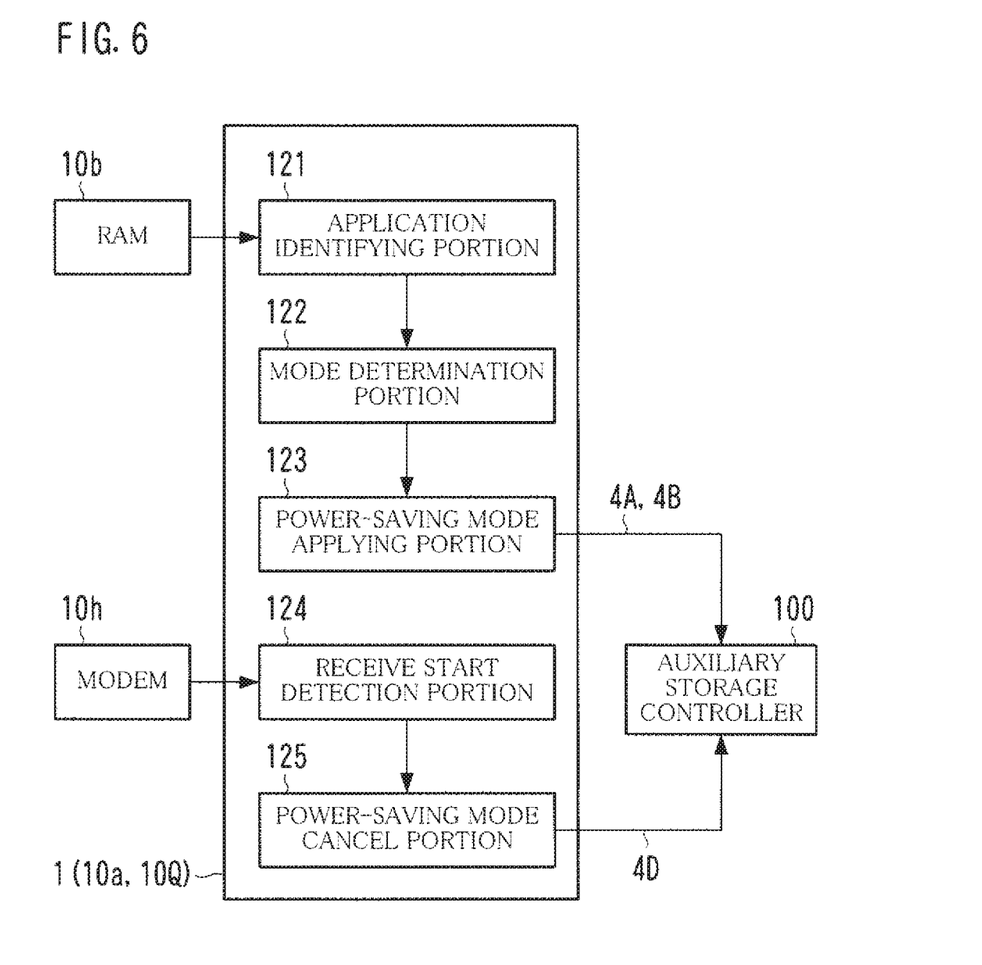
FIG. 6 is a diagram showing an example of the functional configuration of an image forming apparatus.

FIG. 6 is a diagram showing an example of the functional configuration of the image forming apparatus 1.

In the first embodiment, the image forming apparatus 1 determines the power-saving mode of the auxiliary storage 10d based on the available region size V2. In the second embodiment, the image forming apparatus 1 determines the power-saving mode of the auxiliary storage 10d based on an application which has already started. The mechanism thereof is discussed below. Descriptions of parts that are identical with those in the first embodiment are omitted.

The hardware configuration of the image forming apparatus 1 is similar to that shown in FIG. 2 of the first embodiment. It is noted, however, that the ROM 10c or the auxiliary storage 10d has installed therein a power-saving program 10Q instead of the power-saving program 10P.

The power-saving program 10Q implements the functions of an application identifying portion 121, a mode determination portion 122, a power-saving mode applying portion 123, a receive start detection portion 124, a power-saving mode cancel portion 125, and so on, all of which are shown in FIG. 6.

The application identifying portion 121 identifies an application which is currently running (loaded) to the application memory region 403 when a state in which the image forming apparatus 1 idles lasts for a predetermined amount of time (3 minutes, for example). Such an application is hereinafter referred to as a "running application". It is possible to exclude a predetermined application from the running application. In particular, arrangement is possible in which the running application does not include an application implementing the basic functions of the image forming apparatus 1, e.g., the functions of copying, PC printing, fax transmission, and fax reception, or a memory-resident application in the RAM 10b.

The running application is detectable by known methods. For example, the application identifying portion 121 can detect the running application by sending an inquiry to a specific module monitoring or managing an application such as a task manager or system monitor of the operating system.

When the application identifying portion 121 identifies the running application, the mode determination portion 122 determines, in accordance with the running application, which of the sleep mode and the standby mode is to be applied to the auxiliary storage 10d.

If the running application is an application of a high-consumption type, then the mode determination portion 122 determines that the power-saving mode to be applied is the standby mode. If the running application is an application of a low-consumption type, then the mode determination portion 122 determines that the power-saving mode to be applied is the sleep mode.

The application of the "high-consumption type" is an application by which, after starting, the available region size V2 is reduced to be smaller than the threshold Vt before a predetermined amount of time elapses. Alternatively, the application of the "high-consumption type" is an application by which the available region size V2 is reduced to be smaller than the threshold Vt a plurality of times greater than a preset number of times. The application of the "low-consumption type" is an application other than the application of the "high-consumption type".

Each of the applications installed in the ROM 10c or the auxiliary storage 10d is preset at any one of the high-consumption type and the low-consumption type. It is desirable to actually run each of the applications beforehand, to detect the available region size V2 thereof, and to set the type.

The power-saving mode applying portion 123 applies, to the auxiliary storage 10d, the power-saving mode determined by the mode determination portion 122. How to apply the power-saving mode is similar to the method for applying by the mode determination portion 103 (see FIG. 4) of the first embodiment.

After the application of the standby mode, when a high-capacity type of application finishes running and is deleted from the application memory region 403, the power-saving mode applying portion 123 may apply the sleep mode to the auxiliary storage 10d.

As with the receive start detection portion 105 of the first embodiment, the receive start detection portion 124 monitors the modem 10h all the time and detects a start of processing for receiving fax data by the modem 10h.

When the receive start detection portion 124 detects the start of processing for receiving, the power-saving mode cancel portion 125 cancels the power-saving mode of the auxiliary storage 10d, as with the power-saving mode cancel portion 106 of the first embodiment.

Figure 7:
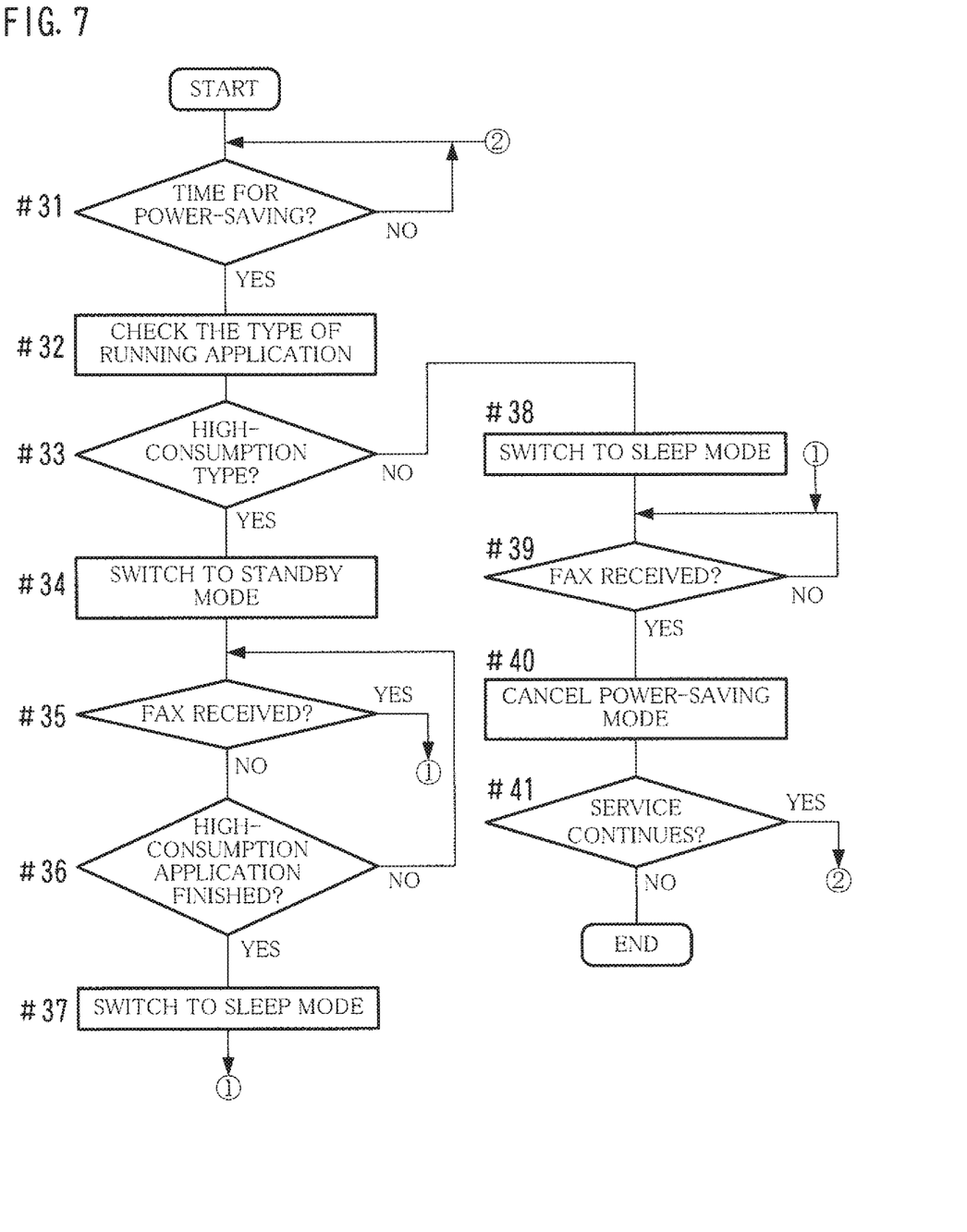
FIG. 7 is a flowchart depicting an example of the flow of processing for managing a power-saving mode of an auxiliary storage.

FIG. 7 is a flowchart depicting an example of the flow of processing for managing the power-saving modes of the auxiliary storage 10d.

The description goes on to the flow of the entire processing by the image forming apparatus 1. The description is provided with reference to the flowchart. The image forming apparatus 1 performs the processing based on the power-saving program 10Q in the steps depicted in FIG. 7.

When a time at which to switch the mode of the auxiliary storage 10d to the power-saving mode is reached (YES in Step #31 of FIG. 7), the image forming apparatus 1 identifies the running application and the type of the running application (Step #32).

If the running application is an application of the high-consumption type (YES in Step #33), then the image forming apparatus 1 determines that the power-saving mode to be applied is the standby mode, and changes the power-saving mode of the auxiliary storage 10d to the standby mode (Step #34).

Thereafter, when no predetermined event related to fax reception occurs (NO in Step #35) and the running application is finished (YES in Step #36), the image forming apparatus 1 changes the power-saving mode of the auxiliary storage 10d to the sleep mode (Step #37).

On the other hand, if the running application is an application of the low-consumption type (NO in Step #33), then the image forming apparatus 1 determines that the power-saving mode to be applied is the sleep mode to change the power-saving mode of the auxiliary storage 10d to the sleep mode (Step #38).

After the mode is changed to the standby mode or the sleep mode, if the predetermined event related to fax reception occurs (YES in Step #35 or YES in Step #39), then the image forming apparatus 1 cancels the power-saving mode of the auxiliary storage 10d and restores the rotation of the magnetic disk of the auxiliary storage 10d to the normal rotational speed (Step #40).

While providing service (YES in Step #41), the image forming apparatus 1 performs the processing of Steps #31-40 appropriately.

According to the second embodiment, in using the virtual memory, the image forming apparatus 1 can save power consumed in the auxiliary storage 10d and prevent data received from the terminal 2A or the facsimile terminal 2B from being lost.

In the second embodiment, the image forming apparatus 1 determines the power-saving mode depending on whether the running application is an application of the high-consumption type or an application of the low-consumption type. Instead of this, another arrangement is possible. To be specific, for each application, the size of a free space necessary to store data to be dealt with (necessary size) is set, and the power-saving mode is determined depending on whether or not the sum of necessary sizes for the running applications is larger than a threshold.

It is to be understood that the overall configuration of the image forming apparatus 1, the constituent elements thereof, the content of the processing, the order of the processing, and the like may be appropriately modified without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising:
a memory;
an auxiliary storage used as a virtual memory together with the memory; and
a hardware processor;
wherein:
the hardware processor determines whether or not a predetermined region set in the memory has a free space corresponding to a size of a necessary region to be reserved for execution of a specific application,
when it is determined that the predetermined region does not have the free space, the hardware processor applies a first power-saving mode as a power-saving mode of the auxiliary storage,
when it is determined that the predetermined region has the free space, the hardware processor applies, as the power-saving mode of the auxiliary storage, a second power-saving mode in which less power is consumed than in the first power-saving mode, and
the first power-saving mode and the second power-saving mode are power-saving modes specific to the auxiliary storage.

2. The image processing apparatus according to claim 1, wherein the hardware processor determines whether or not the predetermined region has the free space by detecting a used region size, in the predetermined region, of a region used by a second application which is running and different from the specific application and by checking whether or not a difference obtained by subtracting the used region size from a whole size of the predetermined region is equal to or greater than the size of the necessary region.

3. The image processing apparatus according to claim 1, wherein:
the auxiliary storage is a hard disk drive,
the first power-saving mode is a mode in which a supply of electric power to the auxiliary storage is not stopped and a rotational speed of a magnetic disk of the auxiliary storage is reduced or rotation of the magnetic disk is stopped, and
the second power-saving mode is a mode in which the supply of electric power to the auxiliary storage is stopped.

4. The image processing apparatus according to claim 1, further comprising a communication device capable of using "N" fax lines concurrently,
wherein the specific application is to print an image onto paper based on fax data received by the communication device, and the size of the necessary region is equal to a size of data for "N" fax pages.

5. The image processing apparatus according to claim 1, further comprising a communication device for receiving data from a terminal in accordance with an Internet Protocol (IP),
wherein the specific application is to print an image onto paper based on PC printing data received by the communication device, the number of terminals using PC printing concurrently is estimated to be "M", and the size of the necessary region is equal to a size of data for "M" pages for the PC printing.

6. The image processing apparatus according to claim 1, further comprising:
a modem capable of using "N" fax lines concurrently; and
an IP communication device for receiving data from a terminal in accordance with an IP,
wherein:
the hardware processor determines whether or not the predetermined region set in the memory has a free space corresponding to a size of a necessary region to be reserved for execution of a plurality of specific applications,
one of the specific applications is to print an image onto paper based on fax data received by the modem,
another one of the specific applications is to print an image onto paper based on PC printing data received by the IP communication device,
the number of terminals using PC printing concurrently is estimated to be "M", and the size of the necessary region is equal to a sum of a size of data for "N" fax pages and a size of data for "M" pages for the PC printing.

7. A non-transitory recording medium storing a computer readable program used in an image processing apparatus, the image processing apparatus including a memory, and an auxiliary storage used as a virtual memory together with the memory, the computer readable program controlling the image processing apparatus to execute processing comprising:

determination processing for determining whether or not a predetermined region set in the memory has a free space corresponding to a size of a necessary region to be reserved for execution of a specific application; and power-saving processing comprising:
when it is determined that the predetermined region does not have the free space, applying a first power-saving mode as a power-saving mode of the auxiliary storage, and
when it is determined that the predetermined region has the free space, applying, as the power-saving mode of the auxiliary storage, a second power-saving mode in which less power is consumed than in the first power-saving mode, and wherein the first power-saving mode and the second power-saving mode are power-saving modes specific to the auxiliary storage.

* * * * *